(12) United States Patent
Chen et al.

(10) Patent No.: US 11,570,000 B2
(45) Date of Patent: Jan. 31, 2023

(54) BLOCKCHAIN-BASED METHOD AND DEVICE FOR PROCESSING DRIVING DATA

(71) Applicant: ZHIJI AUTOMOTIVE TECHNOLOGY CO., LTD., Shanghai (CN)

(72) Inventors: Yanyu Chen, Shanghai (CN); Yujia Zhang, Shanghai (CN); Gang Qian, Shanghai (CN); Minwei Fang, Shanghai (CN); Wei Zhang, Shanghai (CN); Ruixue Wang, Shanghai (CN)

(73) Assignee: Zhiji Automotive Technology Co., Ltd., Shanghai (CN)

( * ) Notice: Subject to any disclaimer, the term of this patent is extended or adjusted under 35 U.S.C. 154(b) by 0 days.

(21) Appl. No.: 17/555,266

(22) Filed: Dec. 17, 2021

(65) Prior Publication Data

US 2022/0407704 A1 Dec. 22, 2022

(30) Foreign Application Priority Data

Jun. 21, 2021 (CN) .......................... 202110682654.7

(51) Int. Cl.
*H04L 9/32* (2006.01)
*H04L 29/06* (2006.01)
(Continued)

(52) U.S. Cl.
CPC .......... *H04L 9/3215* (2013.01); *H04L 9/0643* (2013.01); *H04W 4/46* (2018.02); *H04L 9/50* (2022.05)

(58) Field of Classification Search
CPC ....... H04L 9/3215; H04L 9/0643; H04W 4/46
(Continued)

(56) References Cited

U.S. PATENT DOCUMENTS 10,719,501 B1 * 7/2020 Leise ................. G06Q 30/0645
10,891,694 B1 * 1/2021 Leise .................... H04L 9/3239
(Continued)

FOREIGN PATENT DOCUMENTS

CN 109451467 A 3/2019
CN 110995852 A 4/2020
(Continued)

OTHER PUBLICATIONS

Extended European Search Report issued in EP Application No. 21216993.2, dated Jun. 13, 2022,(8p).

*Primary Examiner* — Haresh N Patel
(74) *Attorney, Agent, or Firm* — Arch & Lake LLP (57) ABSTRACT

Methods and devices are provided for uploading driving data to a blockchain network. The method is executed at a vehicle node in the blockchain network and includes: packing driving data of the vehicle node within a predetermined time interval every predetermined time interval to obtain a vehicle data packet of the vehicle, and storing the vehicle data packet locally in the vehicle node; broadcasting the vehicle data packet to other vehicle nodes located nearby and in the blockchain network for the other vehicle nodes to receive and store; receiving and storing other vehicle data packets broadcast by the other vehicle nodes located nearby and in the blockchain network; and when connecting to a fixed node that belongs to the blockchain network, synchronizing the vehicle data packet and the other vehicle data packets as stored to the fixed node, wherein the fixed node participates in the consensus of the blockchain network.

20 Claims, 4 Drawing Sheets

(51) Int. Cl.
*H04W 4/46* (2018.01)
*H04L 9/06* (2006.01)
*H04L 29/08* (2006.01)
*H04L 9/00* (2022.01)

(58) Field of Classification Search
USPC ........................................................ 713/168
See application file for complete search history.

(56) References Cited

U.S. PATENT DOCUMENTS

| | | |
|---|---|---|
| 10,949,926 B1* | 3/2021 | Call .................. G06Q 40/08 |
| 11,386,498 B1* | 7/2022 | Leise .................. G06N 20/00 |
| 11,416,942 B1* | 8/2022 | Leise .................. G07C 5/0866 |
| 2020/0145191 A1* | 5/2020 | Qi .................. H04L 9/3247 |
| 2021/0084015 A1* | 3/2021 | Benson .............. H04L 63/0428 |
| 2021/0112410 A1* | 4/2021 | Mitra .................. H04W 12/069 |
| 2021/0118060 A1* | 4/2021 | Floyd .................. G07C 5/085 |
| 2021/0271464 A1* | 9/2021 | McFarland, Jr. ......... G06F 8/65 |
| 2021/0271465 A1* | 9/2021 | McFarland, Jr. ....... H04L 67/34 |
| 2021/0272385 A1* | 9/2021 | McFarland, Jr. .... G06Q 10/063 |
| 2021/0326992 A1* | 10/2021 | Leise .................. H04L 9/3249 |
| 2021/0342946 A1* | 11/2021 | Leise .................. G06Q 20/4015 |
| 2021/0389138 A1* | 12/2021 | Morton ................ G08G 1/0145 |
| 2022/0084422 A1* | 3/2022 | Ahlbrecht ............ G05D 1/0291 |

FOREIGN PATENT DOCUMENTS

| | | | |
|---|---|---|---|
| CN | 111695961 A | | 9/2020 |
| CN | 113394880 A | * | 9/2021 |

* cited by examiner

BLOCKCHAIN-BASED METHOD AND DEVICE FOR PROCESSING DRIVING DATA

CROSS-REFERENCE TO RELATED APPLICATION

This application is based upon and claims priority to Chinese Patent Application No. CN202110682654.7, filed on Jun. 21, 2021, the disclosure of which is incorporated hereby in its entirety for all purposes.

TECHNICAL FIELD

The present disclosure relates to the field of vehicle driving data processing, and more specifically to a blockchain-based method and device for processing driving data.

BACKGROUND

Users' vehicles consume a lot of energy along with the accumulation of mileage during the entire life cycle, and generate a large amount of data at all times. Automobile companies may acquire a large amount of vehicle driving data, which may be used for the iterative evolution of enterprise products. Blockchain-based technologies may make full use of these data, and driving data that is processed based on blockchain may achieve reliable and tamper-proof storage, which has advantages in vehicle management and transactions.

When vehicle mileage data is processed based on blockchain, it is necessary to ensure that the data may be accurately and timely uploaded to the blockchain, which is also conducive to rewarding vehicles and users that generate the data in a timely manner. However, for a vehicle in use, high-quality communication may not be ensured because it is in a moving state, which affects the uploading of data. Fixed devices such as charging piles may have stable communication quality. Therefore, the vehicle may, for example, upload the driving data through a charging pile during charging. However, the vehicle in use cannot be frequently connected to the fixed device. If the data is uploaded through the charging pile only during charging, it may cause problems such as delayed data upload or insufficient local storage space.

On the other hand, the same blockchain network may include a plurality of different partner nodes, each partner node has a plurality of subordinate vehicle nodes, and these partner nodes jointly participate in the management and construction of the blockchain network. For such a blockchain network, it is necessary to consider how partner nodes and their vehicle nodes join or exit the blockchain network.

Therefore, there is a need for methods and devices that may solve the above-mentioned problems.

SUMMARY

A brief summary of the present disclosure is given below in order to provide a basic understanding of some aspects of the present disclosure. However, it should be understood that this summary is not an exhaustive summary of the present disclosure. It is not intended to be used to determine the key or important part of the present disclosure, nor is it intended to be used to limit the scope of the present disclosure. Its purpose is merely to present some concepts about the present disclosure in a simplified form as a prelude to the more detailed description given later.

According to a first aspect of the present disclosure, a method for uploading driving data to a blockchain network is provided. The method is executed at a vehicle node in the blockchain network includes: packing driving data of the vehicle node within a predetermined time interval every predetermined time interval to obtain a vehicle data packet of the vehicle, and storing the vehicle data packet locally in the vehicle node; broadcasting the vehicle data packet to other vehicle nodes located nearby and in the blockchain network for the other vehicle nodes to receive and store; receiving and storing other vehicle data packets broadcast by the other vehicle nodes located nearby and in the blockchain network; and when connecting to a fixed node that belongs to the blockchain network, synchronizing the vehicle data packet and the other vehicle data packets as stored to the fixed node in order to upload the same to the blockchain network through the fixed node, wherein the fixed node participates in the consensus of the blockchain network.

According to a second aspect of the present disclosure, a vehicle node device configured to upload driving data to a blockchain network is provided. The vehicle node device includes: a data processor configured to pack driving data of a vehicle node within a predetermined time interval every predetermined time interval to obtain a vehicle data packet of the vehicle; a data storage configured to store the vehicle data packet and other vehicle data packets broadcast by other vehicle nodes located nearby and in the blockchain network; a data transceiver configured to: broadcast the vehicle data packet to the other vehicle nodes located nearby and in the blockchain network for the other vehicle nodes to receive and store, and receive the other vehicle data packets broadcast by the other vehicle nodes located nearby and in the blockchain network; and a data synchronizer configured to, when connecting to a fixed node in the blockchain network, synchronize the vehicle data packet and the other vehicle data packets as stored to the fixed node in order to upload the same to the blockchain network through the fixed node, wherein the fixed node participates in the consensus of the blockchain network.

According to a third aspect of the present disclosure, a blockchain network is provided. The blockchain network includes: a vehicle node device according to the second aspect of the present disclosure; a fixed node configured to participate the consensus of the blockchain network; and a partner node configured to participate in the governance of the blockchain network.

According to a fourth aspect of the present disclosure, a non-transitory computer-readable storage medium having a program stored thereon is provided. The program, when being executed by a computer, causes the computer to execute the method according to first aspect of the present disclosure.

According to a fifth aspect of the present disclosure, an apparatus for uploading driving data to a blockchain network is provided. The apparatus includes a memory and a processor. The memory is communicatively coupled with the processor, and the memory stores a program which, when being executed by a processor, causes the processor to execute the method according to the first aspect of the present disclosure.

According to a sixth aspect of the present disclosure, a computer program product is provided. The computer program product includes a computer program which, when being executed by a processor, implements the method according to the first aspect of the present disclosure.

The method and device proposed in the present disclosure may realize flexible and free joining or exiting of the nodes in a blockchain network, may realize accurate and timely uploading of driving data of a vehicle node, and may realize reasonable allocation of rewards among all parties participating in uploading after a block is generated.

Through the following detailed description of exemplary embodiments of the present disclosure with reference to the accompanying drawings, other features and advantages of the present disclosure will become clearer.

BRIEF DESCRIPTION OF THE DRAWINGS

The drawings constituting a part of the description describe the embodiments of the present disclosure, and together with the description, serve to explain the principle of the present disclosure.

With reference to the accompanying drawings, the present disclosure may be understood more clearly according to the following detailed description, in which.

DETAILED DESCRIPTION

The following detailed description is made with reference to the accompanying drawings, and is provided to help a comprehensive understanding of various exemplary embodiments of the present disclosure. The following description includes various details to help understanding, but these details are only considered as examples and not for limiting the present disclosure, which is defined by the appended claims and their equivalents. The words and phrases used in the following description are only used to enable a clear and consistent understanding of the present disclosure. In addition, for clarity and brevity, descriptions of well-known structures, functions, and configurations may be omitted. Those of ordinary skill in the art will recognize that various changes and modifications may be made to the examples described herein without departing from the spirit and scope of the present disclosure.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 1:
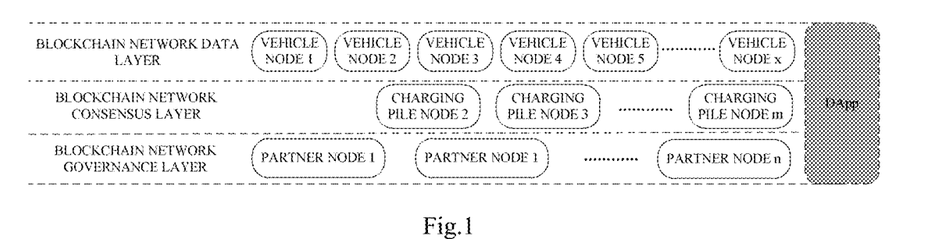
FIG. 1 shows an overall architecture diagram of a blockchain network according to an embodiment of the present disclosure.

FIG. 1 shows an overall architecture diagram of a blockchain network according to an embodiment of the present disclosure. As shown in FIG. 1, a blockchain network may include a blockchain network governance layer, a blockchain network consensus layer, and a blockchain network data layer. The three layers may be coordinated and controlled through a decentralized application (DApp).

Specifically, the blockchain network governance layer may include a plurality of partner nodes, which may participate in the governance of the blockchain network. The blockchain network consensus layer may include a plurality of charging pile nodes, that is, fixed nodes, which may participate in the consensus of the blockchain network. The blockchain network data layer may include a plurality of vehicle nodes, that is, user nodes, which may generate driving data and upload the driving data to the blockchain. A vehicle node may be subordinate to a corresponding partner node.

In an embodiment according to the present disclosure, a first batch of partner nodes may be generated through crowdfunding of certificates of rights and management of the main chain of the blockchain (token1). In an embodiment according to the present disclosure, a partner node may submit a user node white list to the blockchain network to allow user nodes in the white list that are subordinate to the partner node to access the blockchain network. A partner node may use the token1 held by it to pay transaction fees incurred by a user node subordinate to the partner node. In an embodiment according to the present disclosure, the proportion of the token1 consumed accumulatively by each partner node within a certain period of time to the total amount of token1 consumed accumulatively by all partner nodes within the period of time may be taken as the partner node's weight, which may be used for each partner node to participate in voting on the construction and governance of the blockchain network. The construction and governance of the blockchain network may include, for example, joining and exiting of nodes, issuance rules of token1, transaction fees, blockchain network rules, the layout of charging pile nodes, and so on.

In an embodiment according to the present disclosure, a partner node may transfer the token1 when exiting the blockchain network.

In an embodiment according to the present disclosure, after a partner node exits, a vehicle node subordinate to the partner node may then exit the blockchain network, and after exiting, the vehicle node may disable operations associated with the interaction with the blockchain network.

In an embodiment according to the present disclosure, after a partner node exits, a vehicle node subordinate to the exited partner node may send an association application to other partner nodes in the blockchain network as needed. After the application is approved, the vehicle node may change to be subordinated to the other partner nodes in the blockchain network, thereby retaining the permission of the vehicle node to access the blockchain network.

In an embodiment according to the present disclosure, a vehicle node may have a function of data sharing enable control, such that it may freely join or exit the blockchain network through the data sharing enable control. That is, when a partner node to which a vehicle node belongs is in the blockchain network, the data sharing enable function may be turned on to enable operations associated with the interaction between the vehicle node and the blockchain network. The operations associated with the interaction between the vehicle node and the blockchain network may be disabled by turning off the data sharing enable function.

In an embodiment according to the present disclosure, a fixed node may include a vehicle charging device which, when connecting to the fixed node, may charge a vehicle.

Figure 2:
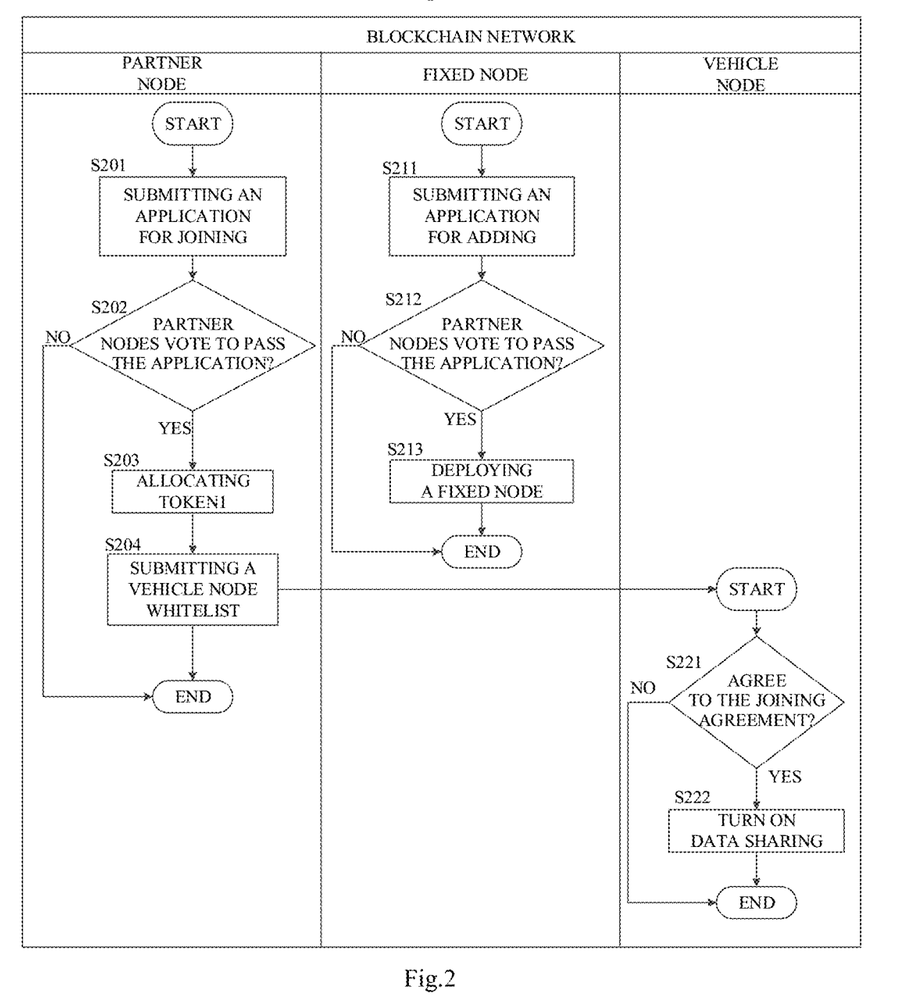
FIG. 2 shows a flowchart of nodes joining a blockchain network according to an embodiment of the present disclosure.

FIG. 2 shows a flowchart of a method for each node to join a blockchain network according to an embodiment of the present disclosure. Specifically, FIG. 2 shows a method for a new partner node to join the blockchain network, a method for a newly added fixed node to join the blockchain network, and a method for a new vehicle node to join the blockchain network.

At S201, a new partner node wishing to join the blockchain network may submit an application for joining to the blockchain network. Then, at S202, the existing partner nodes may vote to decide whether to pass the application for joining. If they decide to pass the application for joining at S202, then at S203, token1 may be allocated to the new partner node, such that the new partner node may pay transaction fees and participate in the construction and governance of the network. Then, at S204, the new partner node may submit a vehicle node whitelist to admit a vehicle node subordinate to the new partner node. If they decide not to pass the application for joining at S202, the process ends directly.

At S211, a partner node wishing to add a fixed node may submit an application for adding a fixed node to the blockchain network. Then, at S212, the existing partner nodes may vote to decide whether to pass the application for adding. If the application for adding is approved, a newly added fixed node may be deployed at S213. If the application for adding is not passed, the process ends directly.

In the case where a vehicle node is subordinate to an existing partner node in the blockchain network and is included in the vehicle node whitelist submitted by the partner node, at S221, it may be judged whether the vehicle node has agreed to a joining agreement. If the vehicle node agrees to the joining agreement at S221, then at S222, the vehicle node may turn on the data sharing function. In an embodiment according to the present disclosure, a vehicle node has data sharing enable control. When the data sharing control function is turned off, the vehicle node stops uploading data to the blockchain network. When the data sharing control function is turned on, the vehicle node can upload data to the blockchain network. If the vehicle node does not agree to the joining agreement at S221, the process ends directly.

Figure 3:
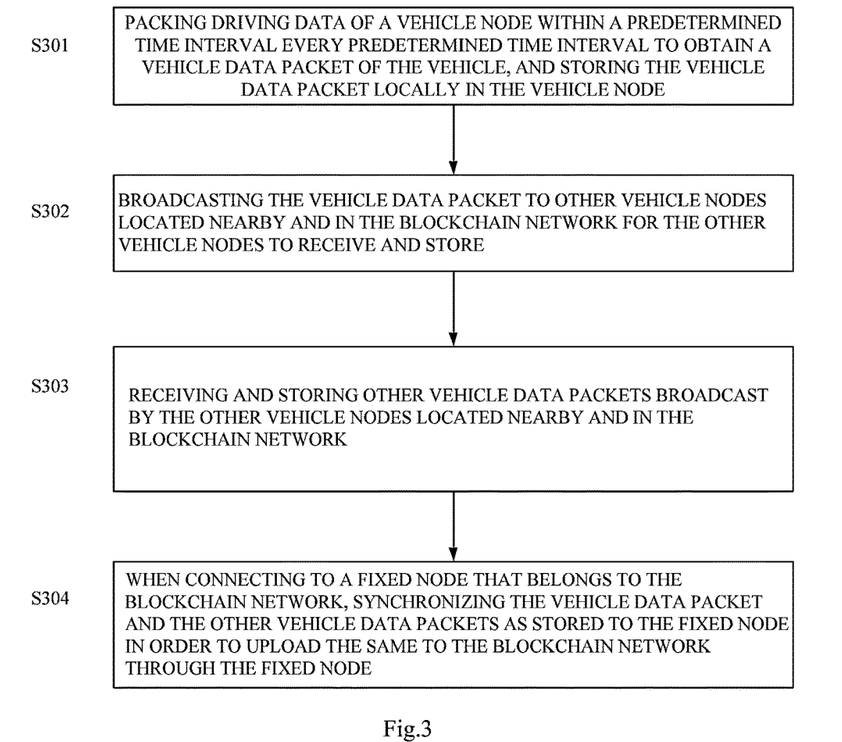
FIG. 3 shows a flowchart of a method for uploading driving data to a blockchain network according to an embodiment of the present disclosure.

FIG. 3 shows a flowchart of a method for uploading driving data to a blockchain network according to an embodiment of the present disclosure. The method may be executed at a vehicle node that belongs to the blockchain network. Specifically, as shown in FIG. 3, the method includes the following steps.

At S301, driving data of a vehicle node within a predetermined time interval may be packed every predetermined time interval to obtain a vehicle data packet of the vehicle, and the vehicle data packet may be stored locally in the vehicle node. For example, the predetermined time interval may be 10 seconds, that is, the driving data of the vehicle may be packed every 10 seconds. It should be noted that the value of the predetermined time interval here is only a non-limiting example, and other values may be set as required.

Figure 4:
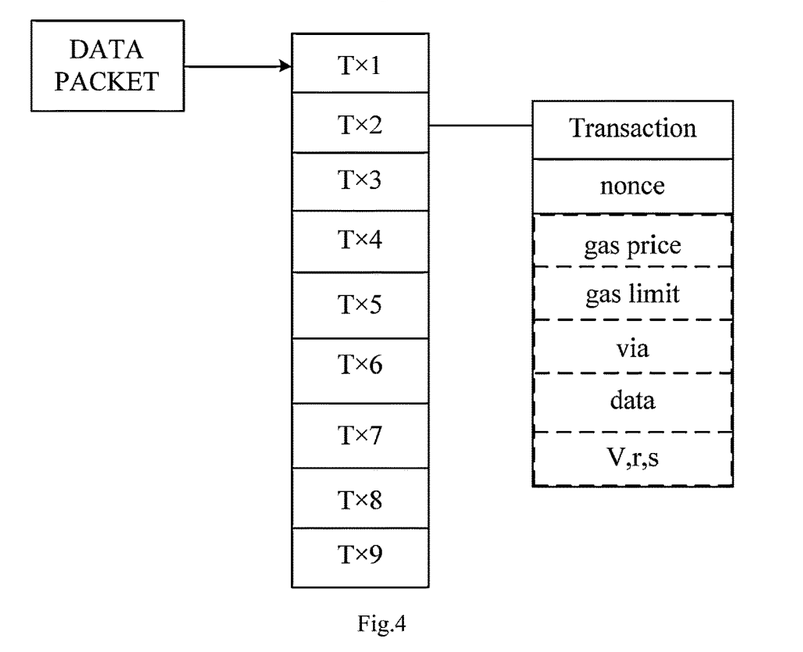
FIG. 4 shows a schematic diagram of the data structure of a data packet uploaded to a blockchain network according to an embodiment of the present disclosure.

Referring to FIG. 4, a schematic diagram of a data structure of a data packet according to an embodiment of the present disclosure is shown. The data packet may include one or more transactions. Nine transactions Tx1, Tx2, ..., Tx9 are shown in FIG. 4, but the number of the transactions that may be included in the data packet is not limited to this. The data structure of each transaction may include the following fields:

nonce: a random number field, which may be used to prevent rebroadcast of transaction messages. This random number field may be empty when a vehicle node initiates a transaction, or be a default value, and be assigned after a data packet is synchronized to a fixed node. The details will be described in detail later in conjunction with FIG. 5.

gas price: the gas that a transaction initiator is willing to pay, namely token1.

gas limit: the maximum gas that the transaction initiator is willing to pay, namely token1.

from: an account address of the transaction initiator, that is, an account address of a vehicle node that generates driving data.

via: an account address of a transaction agent, that is, an account address of a vehicle node that synchronizes the data packet of the driving data to the fixed node.

data: variable-length binary data payload (payload).

v,r,s: a signature of the transaction initiator, which may be used to prevent data tampering.

In an embodiment according to the present disclosure, the transaction data in the data packet may further include a timestamp of the driving data. Upon being uploaded to the blockchain network, the Dapp may acquire the data from the blockchain network, and may judge based on the timestamp of the data whether the vehicle data packet has been repeatedly uploaded, that is, it may be used to prevent the rebroadcast of transaction messages.

In an embodiment according to the present disclosure, the vehicle driving data included in the data packet that is uploaded to the blockchain network may be raw data.

In an embodiment according to the present disclosure, the vehicle driving data included in the data packet may be asymmetrically encrypted vehicle driving data, where a unified public key may be used to encrypt the data, and an asymmetrically encrypted private key is mastered by the partner node and may be used to decrypt the data, which helps to further ensure the security of the data.

Referring back to FIG. 3, next, at S302, the vehicle data packet may be broadcast to other vehicle nodes located nearby and in the same blockchain network for the other vehicle nodes to receive and store. Here, the other vehicle nodes may be subordinate to the same blockchain network.

In an embodiment according to the present disclosure, the broadcasting process may adopt short-range wireless communication technologies, such as UWB, Wi-Fi, Bluetooth, NFC, and so on.

Then, at S303, other vehicle data packets broadcast by the other vehicle nodes located nearby and subordinate to the blockchain network may be received and stored.

In an embodiment according to the present disclosure, the receiving process may similarly adopt short-range wireless communication technologies, such as UWB, Wi-Fi, Bluetooth, and NFC.

Then, at S304, when connecting to a fixed node that belongs to the blockchain network, the vehicle data packet and the other vehicle data packets as stored may be synchronized to the fixed node, so as to be uploaded to the blockchain network through the fixed node.

In an embodiment according to the present disclosure, after the stored data packet is synchronized to the fixed node, the vehicle node may clear the other vehicle data packets as stored to save local storage resources.

It should be noted that although the operations are depicted in a specific order in FIG. 3, this should not be understood as the illustrated steps are limited to the specific order shown, or that all illustrated steps are required to be performed to achieve the desired result. In some cases, multitasking, parallel processing, or other sequential processing may be advantageous. For example, the order of step S302 and step S303 may be interchanged.

Figure 5:
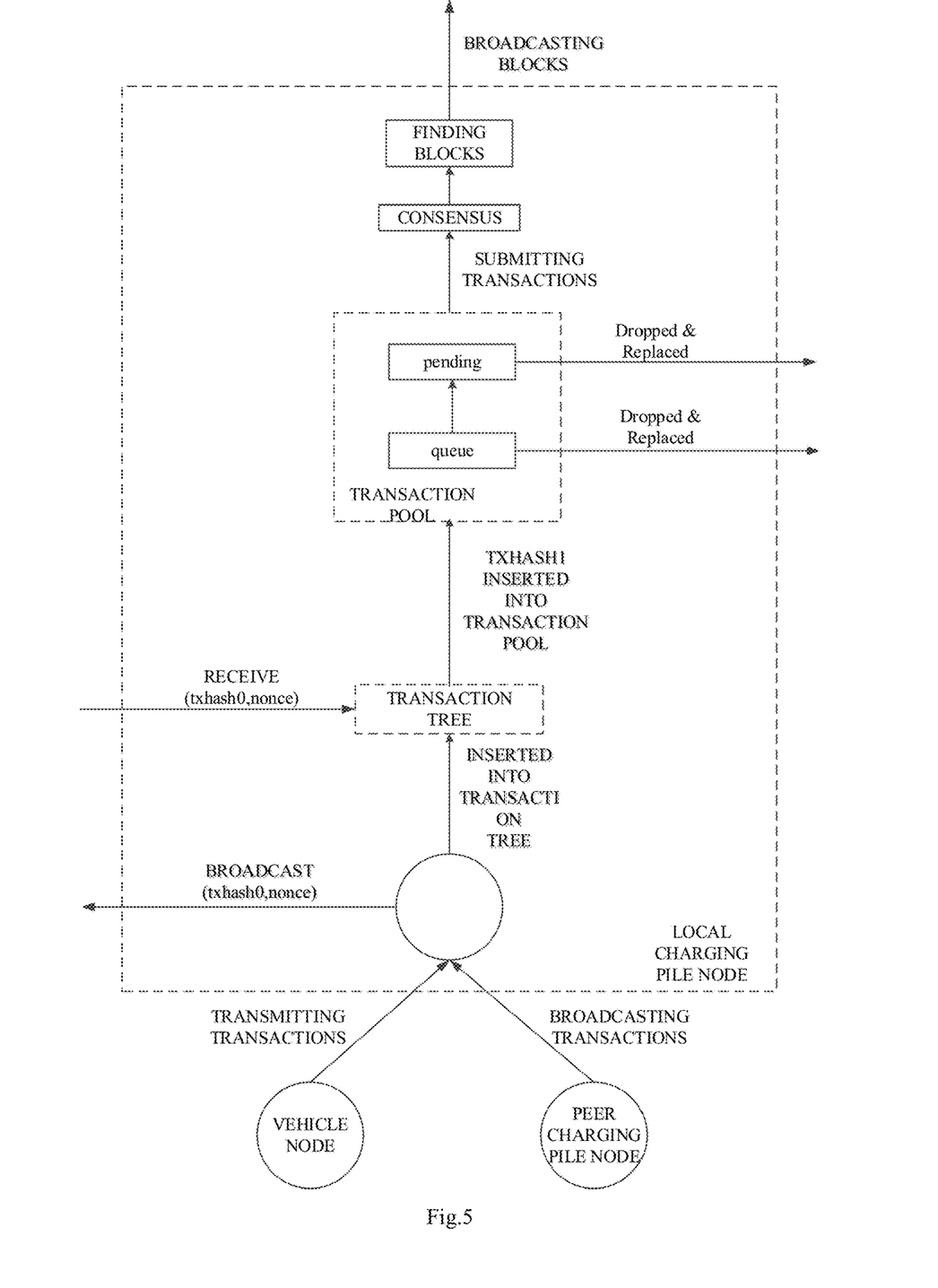
FIG. 5 is a schematic diagram of a method for processing transactions according to an embodiment of the present disclosure.

FIG. 5 shows a schematic diagram of a method for processing transactions according to an embodiment of the present disclosure. This method may be executed at a fixed node (i.e., a charging pile node).

As shown in FIG. 5, a local charging pile node may receive a transaction synchronized from a vehicle node, and may also receive a transaction broadcast from a peer charging pile node. When the vehicle node initiates a transaction, nonce is set to an empty or default value, and a hash txhash0 is generated.

Upon receiving the transaction, the charging pile node may assign a value to nonce, broadcast txhash0 and nonce to the peer charging pile node, and insert txhash0 into a local transaction tree. As a non-limiting example, the method of assigning a value to nonce may include incrementing the value of nonce by 1 for each transaction.

The charging pile node may also receive txhash0 and nonce broadcast from the peer node. Upon receiving txhash0, the charging pile node may insert it into the local transaction tree.

In an embodiment according to the present disclosure, when inserting txhash0 into the local transaction tree, each node may judge whether txhash0 already exists in the transaction tree. If txhash0 already exists in the transaction tree, the corresponding nonce value may be compared, and txhash0 corresponding to a smaller nonce value may be retained. In this way, the uniqueness of txhash0 in the tree can be advantageously guaranteed.

Then, the charging pile node may acquire the transaction and the corresponding nonce from the local transaction tree, generate a hash txhash1, and insert it into a transaction pool. The nonce value here may be acquired from the blockchain network and is not repeated, thereby preventing the rebroadcast of transaction messages.

In the transaction pool, unverified transactions are deposited in queue, and transactions are deposited in pending after being verified. Some transactions that do not meet the conditions may be removed from the transaction pool. For example, the transaction with the lowest gas in the transaction pool may be discarded and replaced. Transactions submitted from the transaction pool may be agreed. Then, in the case of discovering a block, the block may be broadcast among the nodes of the blockchain network.

In an embodiment according to the present disclosure, when the blockchain generates a block, the relevant vehicle node may obtain corresponding value rewards (token2), which may be calculated based on the driving data. Token2 may be traded. The vehicle node itself may not have token1. If a transfer transaction occurs, the initiator may use token2 to exchange token1 with a partner node to pay for the gas consumption of the transaction. The exchange step may be encapsulated in a program and executed automatically with the transaction, without the need for the vehicle node to perform the exchange of token2 to token1 in advance.

In an embodiment according to the present disclosure, the corresponding value rewards obtained by the vehicle node may include value rewards corresponding to driving data generated by the vehicle node and value rewards corresponding to driving data generated by other vehicle nodes and synchronized to a fixed node via the vehicle node.

In an embodiment according to the present disclosure, value rewards corresponding to block generation may be allocated among the nodes participating in data uploading. As a non-limiting example, in the case where driving data generated by a first vehicle node is synchronized to a fixed charging pile node through a second vehicle node, the obtained value rewards corresponding to block generation may be allocated as follows. For example, 70% of the value rewards associated with the driving data generated by the first vehicle node and synchronized by the second vehicle node may be allocated to the first vehicle node, and 30% may be allocated to the second vehicle node. For example, 60% of the value rewards associated with the driving data generated by the first vehicle node and synchronized by the second vehicle node may be allocated to the first vehicle node, 20% may be allocated to the second vehicle node that synchronizes the driving data to the fixed charging pile, and 20% may be allocated to a partner node to which the first vehicle node belongs.

In an embodiment according to the present disclosure, the value rewards corresponding to block generation may be further allocated. That is, in the case where the driving data generated by the first vehicle node is synchronized to the fixed charging pile node through the second vehicle node and in the case where the value rewards are allocated between the first vehicle node and the second vehicle node, the value rewards allocated to the first vehicle node may be further allocated between the first vehicle node and the partner node to which the first vehicle node belongs, and the value rewards allocated to the second vehicle node may be further allocated between the second vehicle node and a partner node to which the second vehicle node belongs. For example, the first vehicle node may allocate 30% of the value rewards allocated to the first vehicle node to the partner node to which the first vehicle node belongs, and the second vehicle node may allocate to 30% of the value rewards allocated to the second vehicle node to the partner node to which the second vehicle node belongs.

The embodiments here are only exemplary, and the allocation scheme and specific ratio are not limited thereto.

Referring to FIG. 4, the vehicle data packet that is uploaded to the blockchain network includes an account address (from field) of a vehicle node that generates driving data and an account address of a vehicle node that synchronizes the vehicle data packet to a fixed node (via field), and rewards may be allocated to the accounts corresponding to these fields.

In an embodiment according to the present disclosure, the account address of the vehicle node that generates the driving data and the account address of the vehicle node that synchronizes the vehicle data packet to the fixed node may be the same, that is, the vehicle node may synchronize the data packet of the driving data generated by itself to the fixed node without via the other vehicle nodes.

In an embodiment according to the present disclosure, the account address of the vehicle node that generates the driving data and the account address of the vehicle node that synchronizes the vehicle data packet to the fixed node may be different, that is, the first vehicle node may synchronize the data packets of the driving data generated by the first vehicle node to the fixed node via the second vehicle node different from the first vehicle node.

In an embodiment according to the present disclosure, the vehicle node may directly upload the vehicle data packet to the blockchain network without via the fixed node and the other vehicle nodes. For example, when the vehicle node has stable communication quality and sufficient energy, the vehicle node may complete the uploading of the data packet of the driving data of the vehicle and/or the data packet of the driving data broadcast from the other vehicle nodes.

In an embodiment according to the present disclosure, the vehicle node may not synchronize to the fixed node but only upload the vehicle data packet to the blockchain network via the other vehicle nodes. For example, in the case where the other vehicle nodes to which the vehicle data packet is broadcast have stable communication quality and sufficient energy, the other vehicle nodes may automatically complete the uploading of the data packet of the vehicle's driving data.

In an embodiment according to the present disclosure, the vehicle node may upload the vehicle data packet to the blockchain network via the fixed node rather than via the other vehicle nodes. As a non-limiting example, if there are no other vehicle nodes near the vehicle node that may perform short-range wireless communication with it and may synchronize the data packet of the driving data to the fixed node during the driving process, the vehicle node may synchronize the data packets of all driving data that have not been uploaded to a fixed node of a charging pile in a delayed manner and upload the same until it is connected to the charging pile for charging after the driving is ended.

Figure 6:
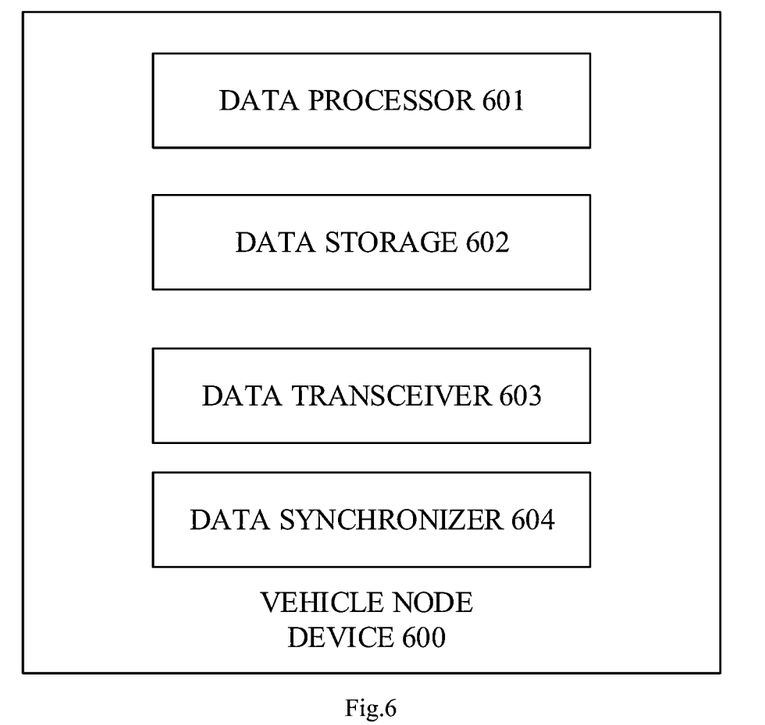
FIG. 6 is an exemplary schematic diagram of a vehicle node device according to an embodiment of the present disclosure.

FIG. 6 is an exemplary configuration of a vehicle node device 600 according to an embodiment of the present disclosure. As shown in FIG. 6, the vehicle node device 600 may include a data processor 601, a data storage 602, a data transceiver 603, and a data synchronizer 604. The data processor 601 may be configured to pack driving data of a vehicle node within a predetermined time interval every predetermined time interval to obtain a vehicle data packet of the vehicle. The data storage 602 may be configured to store the vehicle data packet and other vehicle data packets broadcast by other vehicle nodes located nearby and subordinate to the same blockchain network. The data transceiver 603 may be configured to broadcast the vehicle data packet of the vehicle to the other vehicle nodes located nearby and subordinate to the same blockchain network for the other vehicle nodes to receive and store, and to receive the other vehicle data packets broadcast by the other vehicle nodes located nearby and subordinate to the same blockchain network. The data synchronizer 604 may be configured to, when connecting to a fixed node subordinate to the same blockchain network, synchronize the vehicle data packet and the other vehicle data packets as stored to the fixed node in order to upload the same to the blockchain network through the fixed node, where the fixed node participates in the consensus of the blockchain network.

Figure 7:
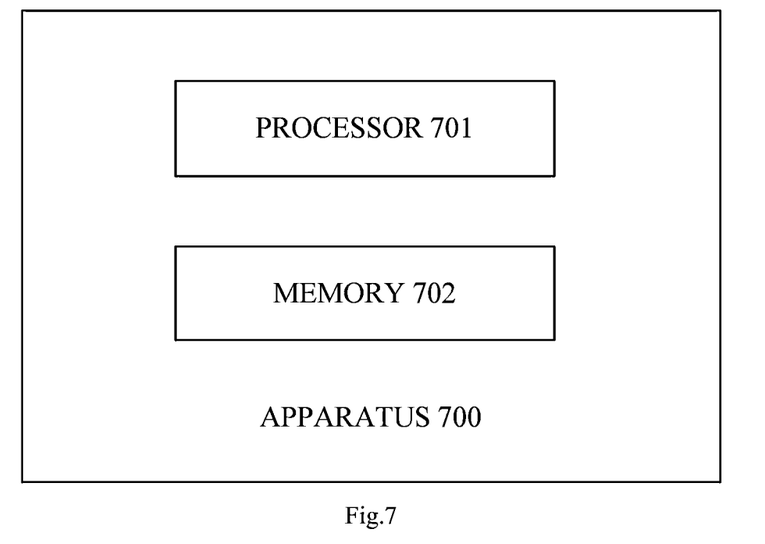
FIG. 7 is a schematic diagram of an apparatus for uploading driving data to a blockchain network according to an embodiment of the present disclosure.

FIG. 7 is a schematic diagram of an apparatus 700 for uploading driving data to a blockchain network according to an embodiment of the present disclosure. The apparatus 700 may include a processor 701 and a memory 702. The memory 702 may be communicatively coupled with the processor 701. The memory 702 stores a program which, when being executed by the processor, causes the processor 701 to execute the method according to the embodiment of the present disclosure. The processor 701 may be any kind of processor, and may include, but is not limited to, one or more general-purpose processors or special-purpose processors (such as special-purpose processing chips). The memory 702 may include volatile and nonvolatile medium as well as removable and non-removable medium. For example, the memory 702 may include any combination of the following: random access memory ("RAM"), dynamic RAM ("DRAM"), static RAM ("SRAM"), read only memory ("ROM"), flash memory, cache memory and/or any other types of non-transitory computer readable medium.

In all examples shown and discussed herein, any specific value should be interpreted as merely exemplary, rather than as a limitation. Therefore, other examples of the exemplary embodiment may have different values.

As used herein, the word "exemplary" means "serving as an example, an instance, or an illustration" and not as a "model" to be copied exactly. Any implementation described exemplarily herein is not necessarily construed as being preferred or advantageous over other implementations. Moreover, the present disclosure is not limited by any expressed or implied theory given in the above technical field, background, summary, or detailed description.

In addition, for reference purposes only, "first", "second" and similar terms may also be used herein, and thus are not intended to be limiting. For example, unless clearly indicated by the context, the words "first", "second" and other such numerical words referring to structures or elements do not imply an order or sequence.

It should be understood that, when the word "comprise/include" is used in this text, it indicates that the specified features, integers, steps, operations, units and/or components exist, but it does not exclude the presence or addition of one or more other features, integers, steps, operations, units and/or components and/or combinations thereof.

As used herein, the term "and/or" includes any and all combinations of one or more of the associated listed items. The terms used herein are only for the purpose of describing specific embodiments, and are not intended to limit the present disclosure. As used herein, singular forms "a", "an" and "the" are also intended to include plural forms, unless the context clearly dictates otherwise.

Those skilled in the art should realize that the boundaries between the above operations are merely illustrative. A plurality of operations may be combined into a single operation, a single operation may be distributed in additional operations, and the operations may be executed at least partially overlapping in time. Also, alternative embodiments may include a plurality of instances of specific operations, and the order of operations may be changed in other various embodiments. However, other modifications, changes and replacements are also possible. Therefore, the description and drawings should be regarded as illustrative rather than restrictive.

Although some specific embodiments of the present disclosure have been described in detail through examples, those skilled in the art should understand that the above examples are only for illustration and not for limiting the scope of the present disclosure. The various embodiments disclosed herein may be combined arbitrarily without departing from the spirit and scope of the present disclosure. Those skilled in the art should also understand that various modifications may be made to the embodiments without departing from the scope and spirit of the present disclosure.

What is claimed is:

1. A method for uploading driving data to a blockchain network, the method comprising:
   packing, by a vehicle node in the blockchain network, driving data of the vehicle node within a predetermined time interval every predetermined time interval to obtain a vehicle data packet of the vehicle, and storing the vehicle data packet locally in the vehicle node;
   broadcasting, by the vehicle node, the vehicle data packet to other vehicle nodes located nearby and in the blockchain network for the other vehicle nodes to receive and store;
   receiving, by the vehicle node, and storing other vehicle data packets broadcast by the other vehicle nodes located nearby and in the blockchain network; and
   in response to connecting to a fixed node that belongs to the blockchain network, synchronizing, by the vehicle node, the vehicle data packet and the other vehicle data packets as stored to the fixed node in order to upload the vehicle data packet and the other vehicle data packets to the blockchain network through the fixed node, wherein the fixed node participates in a consensus of the blockchain network,
   wherein the vehicle node is configured to: according to communication quality and energy of the vehicle node, directly upload the vehicle data packet to the blockchain network at the vehicle node or upload the vehicle data packet to the blockchain network via the fixed node and the other vehicle nodes.

2. The method according to claim 1, further comprising:
   when a block is generated, obtaining, by the vehicle node, corresponding value rewards,
   wherein the value rewards are calculated based on the driving data.

3. The method according to claim 2, wherein:
   the vehicle data packet that is uploaded to the blockchain network comprises an account address of the vehicle node that generates the driving data and an account address of a vehicle node that synchronizes the vehicle data packet to the fixed node; and
   the corresponding value rewards comprise value rewards corresponding to the driving data generated by the vehicle node and value rewards corresponding to driving data generated by the other vehicle nodes and synchronized to the fixed node via the vehicle node.

4. The method according to claim 1, wherein:
   the vehicle data packet that is uploaded to the blockchain network comprises a random number field for preventing rebroadcast,
   wherein when the vehicle data packet is uploaded to the blockchain network, the random number field is used to judge whether the vehicle data packet is repeatedly uploaded.

5. The method according to claim 1, wherein:
   the vehicle data packet that is uploaded to the blockchain network comprises a timestamp of the driving data,
   wherein after the vehicle data packet is uploaded to the blockchain network, the timestamp is used to judge whether the vehicle data packet is repeatedly uploaded.

6. The method according to claim 1, wherein the blockchain network comprises a plurality of partner nodes, and the vehicle node is in one of the plurality of partner nodes, and wherein a partner node exits the blockchain network, a vehicle node in the partner node exits the blockchain network, and execution of the method is stopped.

7. The method according to claim 1, wherein the vehicle node has a data sharing enable control, and when the data sharing control function is turned off, execution of the method is stopped.

8. The method according to claim 1, further comprising:
   after the other vehicle data packets as stored are synchronized to the fixed node, clearing the other vehicle data packets as stored.

9. The method according to claim 1, further comprising:
   the vehicle data packet is directly uploaded to the blockchain network rather than via the fixed node.

10. A vehicle node device, the vehicle node device comprising:
    a data processor configured to pack driving data of a vehicle node within a predetermined time interval every predetermined time interval to obtain a vehicle data packet of the vehicle;
    a data storage configured to store the vehicle data packet and other vehicle data packets broadcast by other vehicle nodes located nearby and in a blockchain network;
    a data transceiver configured to:
    broadcast the vehicle data packet to the other vehicle nodes located nearby and in the blockchain network for the other vehicle nodes to receive and store, and
    receive the other vehicle data packets broadcast by the other vehicle nodes located nearby and in the blockchain network; and
    a data synchronizer configured to, in response to connecting to a fixed node in the blockchain network, synchronize the vehicle data packet and the other vehicle data packets as stored to the fixed node in order to upload the vehicle data packet and the other vehicle data packets to the blockchain network through the fixed node, wherein the fixed node participates in a consensus of the blockchain network,
    wherein the vehicle node is configured to: according to communication quality and energy of the vehicle node, directly upload the vehicle data packet to the blockchain network at the vehicle node or upload the vehicle data packet to the blockchain network via the fixed node and the other vehicle nodes.

11. The vehicle node device according to claim 10, wherein:
    when a block is generated, obtaining, by the vehicle node, corresponding value rewards, wherein the value rewards are calculated based on the driving data.

12. The vehicle node device according to claim 11, wherein:
the vehicle data packet that is uploaded to the blockchain network comprises an account address of the vehicle node that generates the driving data and an account address of a vehicle node that synchronizes the vehicle data packet to the fixed node; and
the corresponding value rewards comprise value rewards corresponding to the driving data generated by the vehicle node and value rewards corresponding to driving data generated by the other vehicle nodes and synchronized to the fixed node via the vehicle node.

13. The vehicle node device according to claim 10, wherein:
the vehicle data packet that is uploaded to the blockchain network comprises a random number field for preventing rebroadcast,
wherein the random number field is used to judge whether the vehicle data packet is repeatedly uploaded when it is uploaded to the blockchain network.

14. The vehicle node device according to claim 10, wherein:
the vehicle data packet that is uploaded to the blockchain network comprises a timestamp of the driving data,
wherein after the vehicle data packet is uploaded to the blockchain network, the timestamp is used to judge whether the vehicle data packet is repeatedly uploaded.

15. The vehicle node according to claim 10, wherein the blockchain network comprises a plurality of partner nodes, and the vehicle node is in one of the plurality of partner nodes, and wherein a partner node exits the blockchain network, a vehicle node in the partner node exits the blockchain network, and execution of the method is stopped.

16. The vehicle node device according to claim 10, wherein the vehicle node further comprises data sharing enable control, and when the data sharing enable control is turned off, the data transceiver and the data synchronizer are disabled.

17. The vehicle node device according to claim 10, wherein the vehicle node device is further configured to:
after the other vehicle data packets as stored are synchronized to the fixed node, clear the other vehicle data packets as stored.

18. The vehicle node device according to claim 10, wherein the vehicle node device is further configured to:
directly upload the vehicle data packet to the blockchain network rather than via the fixed node.

19. A blockchain network, comprising:
a vehicle node device;
a fixed node configured to participate in the consensus of the blockchain network; and
a partner node configured to participate in the governance of the blockchain network, wherein the vehicle node device comprises:
a data processor configured to pack driving data of a vehicle node within a predetermined time interval every predetermined time interval to obtain a vehicle data packet of the vehicle;
a data storage configured to store the vehicle data packet and other vehicle data packets broadcast by other vehicle nodes located nearby and in a blockchain network;
a data transceiver configured to:
broadcast the vehicle data packet to the other vehicle nodes located nearby and in the blockchain network for the other vehicle nodes to receive and store, and
receive the other vehicle data packets broadcast by the other vehicle nodes located nearby and in the blockchain network; and
a data synchronizer configured to, in response to connecting to a fixed node in the blockchain network, synchronize the vehicle data packet and the other vehicle data packets as stored to the fixed node in order to upload the vehicle data packet and the other vehicle data packets to the blockchain network through the fixed node, wherein the fixed node participates in a consensus of the blockchain network,
wherein the vehicle node is configured to: according to communication quality and energy of the vehicle node, directly upload the vehicle data packet to the blockchain network at the vehicle node or upload the vehicle data packet to the blockchain network via the fixed node and the other vehicle nodes.

20. The blockchain network according to claim 19, wherein the vehicle node device is configured to join or exit the blockchain network through data sharing enable control;
wherein the fixed node comprises a vehicle charging device configured to charge a vehicle when the vehicle node device is connected to the fixed node;
wherein the partner node is capable of joining or exiting the blockchain network, and when the partner node joins or exits the blockchain network, a vehicle node device in the partner node subsequently joins or exits the blockchain network; and
wherein the governance comprises voting on whether to add a partner node and whether to deploy a fixed node.

* * * * *